Figure 1:
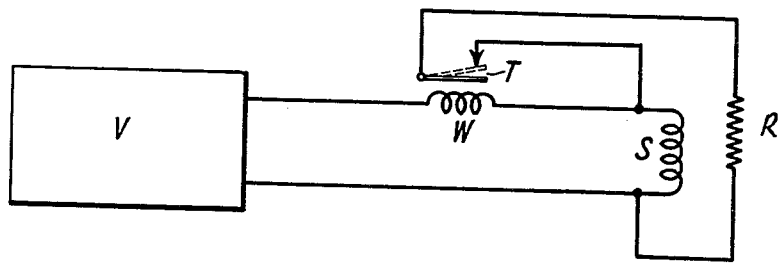

April 8, 1941.   W. REINHARD   2,237,448
OVERLOAD PROTECTION FOR DYNAMIC LOUD-SPEAKERS
Filed June 7, 1938   2 Sheets-Sheet 1

INVENTOR
WERNER REINHARD
BY
ATTORNEYS

Patented Apr. 8, 1941

2,237,448

UNITED STATES PATENT OFFICE 2,237,448

OVERLOAD PROTECTION FOR DYNAMIC LOUD-SPEAKERS

Werner Reinhard, Berlin, Germany, assignor to Telefunken Gesellschaft für Drahtlose Telegraphie m. b. H., Berlin, Germany, a corporation of Germany Application June 7, 1938, Serial No. 212,296
In Germany June 8, 1937

1 Claim. (Cl. 179—186)

In the conventional type of dynamic loud-speaker the coil support or former for the moving or signal-current coil of the diaphragm is preferably manufactured from paper stuff or pulp impregnated with artificial resins or similar varnish or else is made from non-treated paper. The winding which consists of varnished or oxidized wire is held in position upon the paper structure by a suitable cement or agglutinant.

These parts of the drive system and the supporting thereof are comparatively sensitive in reference to relatively great overloads. In the past the opinion was unanimously held that in dynamic loud-speakers the main difficulties resided in the problem of mastering the mechanical stress of the centering member caused by overloads.

However, it has been discovered that insofar as loud-speakers of more than average power are concerned, the overload carrying capacity is largely a function of the thermal stresses of the moving coil or the form thereof as occasioned by the Joule heat dissipated by the signal or voice currents. In this connection it was discovered by applicant that it is not the absolute amplitude of the current that is decisive and crucial, but at the same time also the duration thereof as well as the conditions surrounding the abduction (carrying away or conduction) of the heat. The rise of heating is a function of $J^2 dt$. In other words, such excess temperatures may be due either to that a heavy current acts for a comparatively short while or to a lower current for some longer period of time.

The danger caused by the critical temperature of the moving coil, in other words, the temperature at which the wire or the coil form is caused to change its normal working state consist, for instance, in the fact that the coil form, at temperatures of around 100 degrees C. starts to blister with the result that the material begins to be driven asunder and warp so that the moving coil form scrapes against the air-gap of the magnet system. The insulation of the wire under certain circumstances may be destroyed even at lower temperatures. The changes as before indicated in the moving coil and its form result in strong clanking noises. As a matter of fact, the loud-speaker may be rendered entirely unserviceable. Hence, care must be taken so that the load and thus the temperature of the moving coil will not exceed a definite limit.

As stated above, the excess temperature or the temperature rise of the moving coil is a function of the amplitude of the current and the duration of its action as well as the heat abduction conditions surrounding the moving coil. If an attempt were made to safeguard the moving coil by connecting the customary safety fuse in the circuit comprising the moving coil, this, to be sure, would protect the moving coil against peak currents. However, it would afford no safeguard from lower excess currents lasting for longer periods of time, which, as has been demonstrated, are also capable of occasioning critical temperatures and overheating of the moving coil. Another point is that as practical experience gained in the operation of loud-speakers has shown, the effective value $$\frac{1}{T}\int_0^T J^2 dt$$

of the energy dissipated in heat in the moving coil when energized by music and voice currents (signal currents), considered for a relatively long period of time, lies mostly far below the power peaks lasting mostly only fractions of a second.

Inasmuch as the moving coil has a certain thermal capacity, it will reach its critical temperature, that is to say, the temperature at which the same is endangered only when such large powers last for a comparatively long time. However, as a general rule the time for which peak power is supplied to the moving coil is small in contrast to the time inside which the coil would attain the critical temperature as a result of the fact that peak power happens to prevail. In other words, the moving coil as a general rule does not reach this temperature. Indeed, the loud-speaker is able to carry such a peak transiently, i. e., for a brief time, of a value far above the level which, if permanently or steadily applied would within a short while lead to the production of the admissible limiting temperature. It is, therefore, possible to load the loud-speaker transiently very high without any thermal risk to the drive system being incurred.

For this reason, the customary safety fuses fail to fulfill their function, on the ground that, on the one hand, they are not sufficiently sensitive to cause release in the presence of small currents which, flowing for an appreciable period, are liable to result in critical heating; and that, on the other hand, they become responsive upon the arising of brief peak currents which could not endanger the moving coil. What is, moreover, important is that the safety or protective device should not be destroyed, it being impossible to replace the fuse after each operation or reconnect it in circuit. In other words, a protective device must be provided which will respond to low overloads lasting for relatively long periods of time without being caused to respond to brief peak loads. Moreover, it should not be rendered unserviceable or inoperative once it has responded or reacted.

Now, in the operation of loud-speakers conditions are liable to arise in which a crest load may last for relatively long periods of time, for instance, whenever in a sound pick-up outfit acoustic feedbacks are produced. Also in loud-speakers serving for the reproduction of electric music instruments as well as in the rendition of organ concerts peaks lasting longer times are liable to arise. If the loud-speaker were to be proportioned so that such crest loads will be carried for comparatively long periods of time, it would have to have proportions which would not be warranted for normal operation which, after all, is assumed to prevail most of the time. The loud-speaker would turn out unnecessarily large and, therefore, unnecessarily costly. On the other hand, care would have to be taken so that such more lasting loads will not endanger the moving coil.

This condition, according to the invention is insured by providing, for instance, thermo-responsive switches, resistances having a resistance value being a function of the temperature, more particularly non-linear resistances or the like, in the signal-current circuit, which, as long as the loud-speaker operates under normal conditions, are practically ineffective and which will not affect at all or but inappreciably the peak loads of short duration, while crest loads lasting long periods so that they may endanger the moving coil are markedly reduced. The load of the moving coil in this latter instance is automatically reduced before dangerous heating of the coil has happened. In this manner an increase in the average power and capacity of the loud-speaker is obtainable without it being imperative to enlarge the dimensions of the moving coil and thus the dimensions of the entire magnet system.

What is important in this connection is that, as already stated above the means used should inhere a certain thermal inertia so that they will merely function for protection, but will not affect the dynamic conditions or volume range. The heat inertia of the protective means must be adapted to the thermal inertia of the moving coil. In fact, the protective device must start operating as soon as the moving-coil temperature has approached the critical and dangerous limit. However, they should not act instantaneously as otherwise the volume range of the sound reproduction would be altered.

It is known in the prior art to connect resistances involving high temperature coefficients in amplifiers in series with the transmission or transducer path in order to curtail occurring excess voltages and currents to a level that will be admissible for circuit elements connected further above in order that these may not be overloaded and that no non-linear distortions will thus happen.

Moreover, it is known in the case of iron-hydrogen resistances which are connected in series with the filament of cathode tubes with a view to stabilizing the current flowing through the filament that the thermal inertia of these resistances is equal to, or smaller than, the thermal inertia of the filament so as to prevent the filament's being overstressed or overloaded at the instant of switching in. This condition is insured by using for the resistance a correspondingly slender wire or by varying the vacuum or the gaseous atmosphere.

Figure 2:
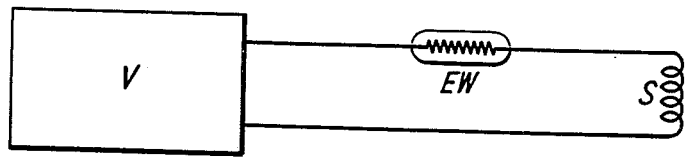
Figure 3:
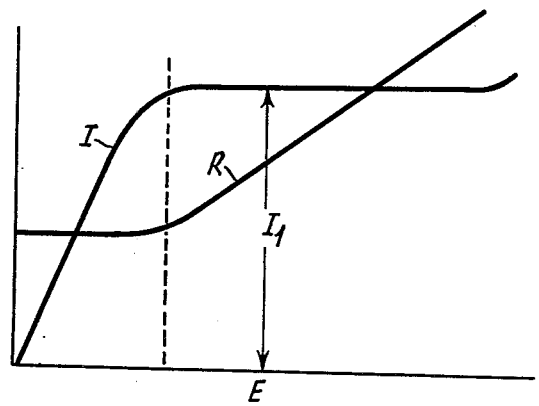
Figure 4:
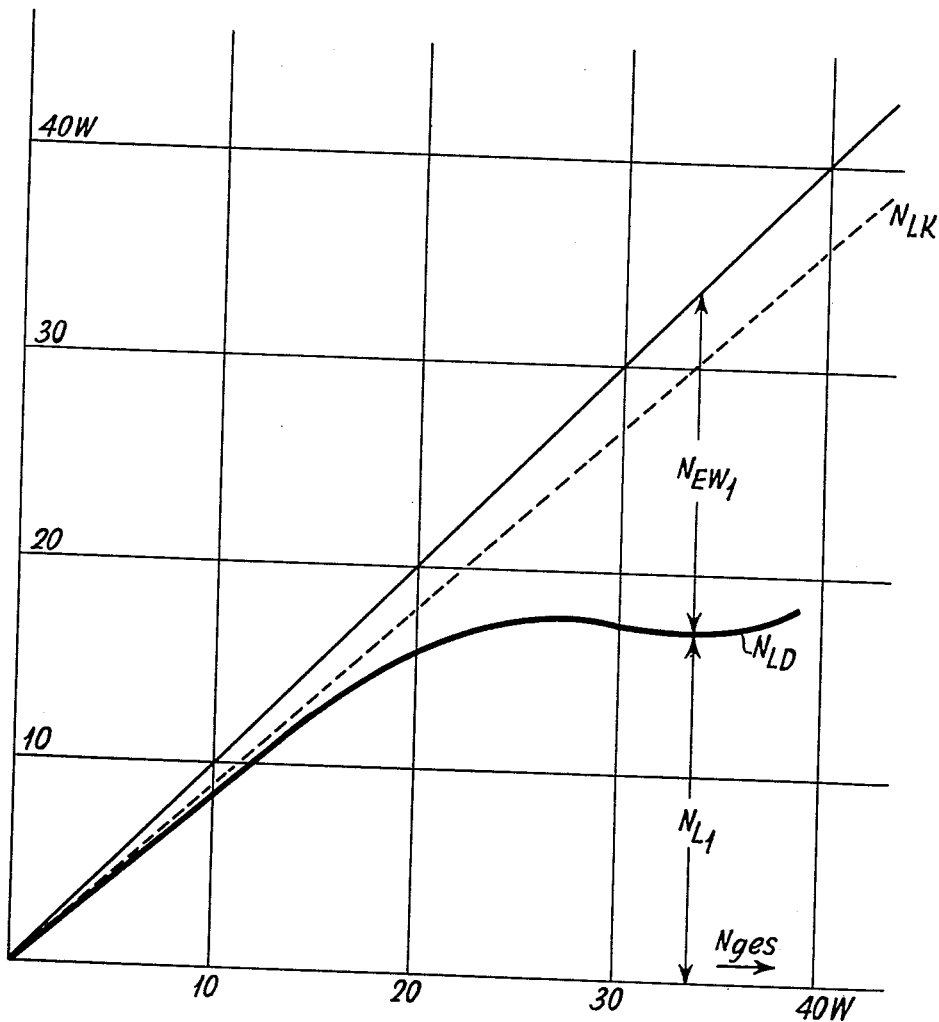

In the appended drawings are illustrated exemplified embodiments of the object of the invention. In the drawings, Fig. 1 shows one embodiment of the invention; Fig. 2 illustrates a modified form of the invention; Figs. 3 and 4 graphically illustrate operating characteristics of the modification shown in Fig. 2. In the circuit organization Fig. 1 there is included in the output circuit of the power amplifier tube V, in series relation to the moving coil S of the loud-speaker, a heater winding (coil) W pertaining to a thermo-type switch such as a bimetallic strip, the said heater winding being traversed by the signal-current. As soon as the load of the moving coil grows too high, the contact T is closed by the thermo-responsive switch and a resistance R is cut in parallel to the moving coil designed to take up the excess of the output energy of amplifier V which endangers the moving coil. The thermo-switch must be of such a nature that the time which expires from the initiation of the current which will endanger the moving coil, if of longer duration, up to the closure of contact T, will be slightly less than the time elapsing until the moving coil has reached the critical temperature.

Thermo-responsive switches do not always satisfy requirements insofar as safety of operation and freedom from disturbance of the switch process are concerned. Hence, in accordance to another exemplified embodiment of the invention arrangements are made so that in series with the moving coil an iron-hydrogen resistance is cut in circuit in series with the moving coil. A circuit organization of this nature is shown in Fig. 2 in which the power delivered by the end-stage or power amplifier is fed to the iron-hydrogen resistance EW to the moving coil.

The operation of this arrangement shall be explained by reference to Figs. 3 and 4. Referring to Fig. 3 it will be seen that the current I and the resistance R are plotted as a function of the potential E. Now, the size of the iron-hydrogen resistance must be so proportioned that as long as the operation of the loud-speaker is normal, the apparatus will work within the range in which the resistance is practically constant; in other words, the first portion of the curve is used. But as soon as an unduly large current flows for a relatively long period of time and when powers arise which are apt to endanger the moving coil, then the current is cut down to the value I. In this connection, also the time-constant of the comparatively sluggish iron-hydrogen resistance plays an essential part. The same, on the one hand, must be so dimensioned that the current-limiting effect of the resistance will arise slightly sooner than the instant when the moving coil becomes endangered by the fact that its critical temperature is attained. On the other hand, the time-constant of the iron-hydrogen resistance should not be unduly low lest the dynamic or volume-range be affected and impaired.

Fig. 4 shows the effect of a properly dimensioned iron-hydrogen resistance which is built in for the safeguarding of a 20-watt loud-speaker. On the abscissa and ordinate are platted the aggregate power or input. The straight graph denoted by $N_{LK}$ indicates in what way, for transient peak loads, the powers are divided in the voice or signal circuit between the moving coil and the iron-hydrogen resistance. The difference between the straight graph placed at a slope of 45 degrees and the straight graph $N_{LK}$ is a measure and criterion for the power taken by the iron-hydrogen resistance. It will be seen that the portion of the power pertaining to the iron-hydrogen resistance is very small, indeed.

The curve designated by $N_{LD}$ shows in what way the powers in the presence of a permanent load become divided. The difference between the 45-degree graph and the $N_{LD}$ graph again corresponds to the power absorbed by the iron-hydrogen resistance. It will be seen from the diagram that even in the presence of powers up to 40 watts the load curve of the loud-speaker always stays below the 20-watt mark. It will be further noticed that in the range up to 15 watts only little power is absorbed by the iron-hydrogen resistance so that the useful or signal power delivered by the loud-speaker is but slightly affected.

In the exemplified embodiment shown in Fig. 2 an iron-hydrogen resistance has been chosen for the limiting element, and the same is connected in series with the moving coil. It will be understood, of course, that also other resistances being a function of temperature, more particularly non-linear resistances could be utilized for the identical purpose. Among these may be mentioned, for instance, resistances known in the art as "hot conductors," that is to say, resistances which in cold condition possess an essentially higher resistance than when hot. Properties of this kind are inherent, for example, in uranium dioxide resistances as well as resistances known as thyrites consisting of porcelain-like substances or matrices in which are incorporated tiny particles of conducting material which, as long as the potential is low acts like insulators, while they turn into comparatively good conductors in proportion as the current rises. These resistances, contradistinct to iron-hydrogen resistances, must, of course, be connected in parallel relation to the moving or signal-current coil.

Whenever it is found that the characteristics of the current-limiting elements that are used do not possess a value suited for particular working conditions of a given loud-speaker, then, by the addition of ohmic resistances or also of non-linear resistances in series or in parallel the characteristic may be influenced in the desired sense and measure. Moreover, the characteristic of the iron-hydrogen resistance and its time-constant may be altered by changing the gas pressure or the composition of the gas as well as by choosing suitable wire cross-sections. However, also vacuum operation is feasible. In lieu of iron, also other metals possessing high temperature coefficients such as tungsten could be employed.

Inasmuch as it is a definite iron-hydrogen resistance or equivalent resistance which will give optimum results when used with loud-speakers comprising a certain construction of moving coil it is recommendable to mount this resistance immediately at the loud-speaker, for instance, the chassis thereof. In this connection it is advantageous to connect the resistance fixedly in series with the moving coil and to bring out the two connecting terminals for the circuit in order that faulty connections may be avoided.

What may also be noted is that the resistances may be connected not only in the secondary part as shown in the exemplified embodiment Fig. 2, but also in the primary.

I claim:

In an audio reproducer system of the type comprising a source of audio currents and a moving voice coil reproducer, the improvement which comprises a resistor device operatively associated with the moving coil to absorb a fraction of the power delivered by said source, said device having a resistance dependent upon temperature in such manner that said fraction is small for temperatures below a normal value and increases increasingly rapidly for temperatures above said normal value, the resistance of said device being so chosen that at the steady normal value of audio input the temperature of the device is said normal temperature, and the thermal capacity of said device being so chosen that the temperature thereof is substantially unaffected by an abnormally high audio input of a duration which is too brief to cause the temperature of the voice coil to rise above an allowable value and which is sufficiently long to prevent impairment of the reproducer volume range.

WERNER REINHARD.